J. H. WORSELL.
GRAIN SCOOP.
APPLICATION FILED JUNE 7, 1916.
1,212,305.
Patented Jan. 16, 1917.
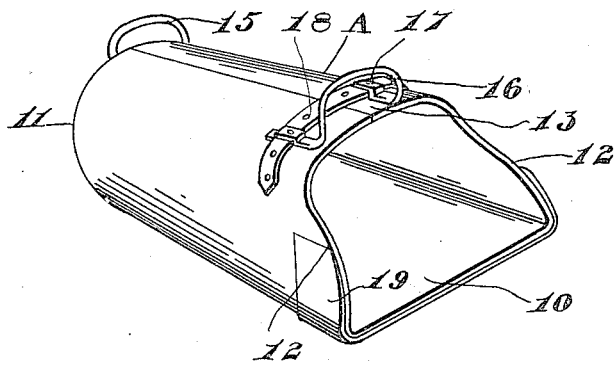
Fig. 1.
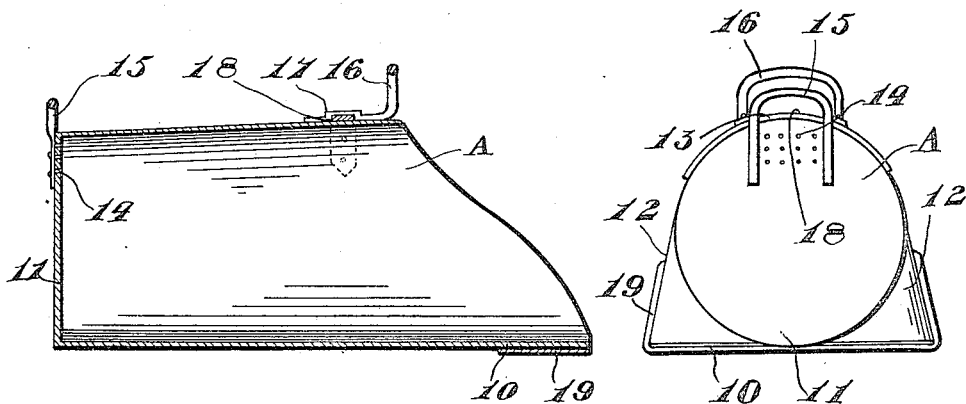
Fig. 2.
Fig. 3.
WITNESS
INVENTOR
J. H. WORSELL
BY Fetherstonhaugh & Co.
ATT'YS.

UNITED STATES PATENT OFFICE.

JOHN HENRY WORSELL, OF GULL LAKE, SASKATCHEWAN, CANADA.

GRAIN-SCOOP.

1,212,305.  Specification of Letters Patent.  Patented Jan. 16, 1917.

Application filed June 7, 1916. Serial No. 102,361.

*To all whom it may concern:*

Be it known that I, JOHN HENRY WORSELL, a subject of the King of Great Britain, and resident of Gull Lake, in the Province of Saskatchewan, Dominion of Canada, have invented certain new and useful Improvements in Grain-Scoops, of which the following is a specification.

This invention relates to improvements in grain scoops and the objects of the invention are to render the scoops non-spilling, to simplify the construction and generally to adapt the scoop to better perform the functions required of it.

With the above objects in view the invention consists essentially of the improved construction particularly described and set forth in the following specification and accompanying drawings forming part of the same.

In the drawings, Figure 1 is a perspective view of the improved scoop. Fig. 2 is a longitudinal section of the same. Fig. 3 is a rear view of the scoop.

Like characters of reference refer to like parts in the several figures.

Referring to the drawings, A represents the scoop which is preferably constructed of metal formed with a flat bottom 10 and terminating at the rear in a disk or circular end 11, the sides of the scoop at the front being inwardly inclined as shown at 12 and bent to form a curvilinear top 13.

The rear end 11 of the scoop is provided near the top with a plurality of orifices 14 and carries a handle 15 riveted or otherwise suitably secured thereto, while the front of the scoop is provided on the top with a handle 16, the ends of which are formed intermediate of their ends with recessed portions 17 adapted to straddle a strip 18 extending across the top of the scoop to bind the same and provide adequate reinforcing. The lip of the scoop is also reinforced by the plate 19 secured to the bottom 10 and extending upwardly partially along the upper edge of the inclined sides 12.

The assembly of the scoop will be readily understood from the foregoing description.

When a scoop of this nature is in use it will be understood that it is suspended by the hand grips 15 and 16 and to discharge the chute it is only necessary to elevate the rear end. The size of the orifices 14 are such that they prevent grain falling therethrough and are so located that air is prevented from accumulating and being compressed in the scoop.

The simplicity of the scoop will readily commend itself to farmers and the like while the durability leaves nothing to be desired.

As many changes could be made in the above construction and many apparently widely different embodiments of my invention, within the scope of the claim, constructed without departing from the spirit or scope thereof, it is intended that all matter contained in the accompanying specification and drawings shall be interpreted as illustrative and not in a limiting sense.

What I claim as my invention is:

A scoop of the class described provided with a flat bottom and having the sides at the front end inwardly inclined and bent to form a curvilinear top, the rear end of the scoop being circular and provided with a plurality of orifices through the top thereof, handles secured to the rear and front end of the scoop respectively, and a reinforcing rib embraced by the front handle and extending around the curvilinear top of the scoop, substantially as described.

In witness whereof I have hereunto set my hand in the presence of two witnesses.

JOHN HENRY WORSELL.

Witnesses:
A. M. JACQUES,
O. ARMENEAU.